(12) United States Patent
Piner et al.

(10) Patent No.: US 6,378,577 B1
(45) Date of Patent: Apr. 30, 2002

(54) CARRIER CONVERTIBLE FROM A SLING CARRIED VESSEL TO A SCOOP AND BAG FILLER

(75) Inventors: Matthew Hain Piner, P.O. Box 160534, Sacramento, CA (US) 95816-0534; James Earl Schiller, El Dorado Hills, CA (US); Stefan Norman Smyle, Ranebo Cordova, CA (US); Jeremy L. Ramirez, Yuba City, CA (US)

(73) Assignee: Matthew Hain Piner, Sacramento, CA (US)

( * ) Notice: Subject to any disclaimer, the term of this patent is extended or adjusted under 35 U.S.C. 154(b) by 0 days.

(21) Appl. No.: 09/629,502

(22) Filed: Jul. 31, 2000

(51) Int. Cl.[7] .................................................. B65B 1/04
(52) U.S. Cl. ....................... 141/391; 141/114; 141/313; 141/108; 224/257
(58) Field of Search ................................ 141/108, 109, 141/391, 114, 313, 314, 317, 10; 224/257, 258, 254, 608, 610, 613, 617

(56) References Cited

U.S. PATENT DOCUMENTS 438,948 A * 10/1890 Robinson ..................... 141/108
1,182,412 A * 5/1916 Olesberg ..................... 141/108
4,991,758 A * 2/1991 Eaneff
5,065,732 A * 11/1991 Smith

* cited by examiner

Primary Examiner—Steven O. Douglas
(74) Attorney, Agent, or Firm—Bernhard Kreten (57) ABSTRACT

Provided is a carrier convertible from a sling supported vessel to a material handler for filling portable receptacles such as bags from a bulk lot of material. The front end of this unit is a scoop for gathering fluent material. Over top the scoop is a hood that prevents spill out of any material when the unit is raised into an upright position. The hood terminates at a projection that defines a hand grip. The scoop tapers into a flue. This tapering permits multiple units to nest into one another for storage purposes. The flue ends at an opening and the opening is sized so that an industry-specific standard bag fits over the opening. The length of the flue is dimensioned so that upon the bag being placed over the flue a hand can grasp both the carrier and bag easily at the projection. When grasped, the bag is tightened and secured to the carrier by the grasping hand. Other bags of different sizes can be accommodated by either gathering any slack with the gripping hand or making different size units. Above the hood are a pair of stanchions that have a handle traversing the pair. Also, provided is a plug that when placed in the flue inhibits material from passing through that flue and when held in the interior by the projection is stored out of the way during the bagging process.

21 Claims, 7 Drawing Sheets

CARRIER CONVERTIBLE FROM A SLING CARRIED VESSEL TO A SCOOP AND BAG FILLER

FIELD OF THE INVENTION

The following invention relates generally to carriers that are convertible from a vessel to material handlers for filling bags. Particularly, the present invention relates to a container that is convertible from a sling type vessel to a scoop type filler for filling bags with fluent materials.

BACKGROUND OF THE INVENTION

Devices to assist in the filling of fluent material, segmented material, particulate matter or the like into receptacles or containers have been known in the art for years. Common uses for such devices have included bagging grain or granuled material or segmented material from bulk lots into sacks for transporting to a destination.

Devices to carry a worker's tools to a work site have been in use and known in the art for many years. The worker removes the tools from the device and proceeds to work; sometimes utilizing a device, such as a bucket carrying tools. However, most the time the device is placed to the side while work is being undertaken. Thus, there is an underutilization of instrumentalities within the work environment. This leads to excess materials being transported to the work site and if the work site is at a remote location this can result in waste of resources and time which could result in loss of property or injury in an emergency situation.

Many early loading devices of the type described supra were concerned only with providing a device on which a bag or sack could be mounted in such a manner that the mouth or opening of the bag would be maintained in an extended or open position to receive the material from the bulk lot. Probably the most famous of these devices, used in a small scale environment, is U.S. Pat. No. 3,255,570, issued to Weiner on Jun. 14, 1966 and assigned to McDonalds's System, Inc. The device is the scoop that McDonald's restaurant employees use to fill french-fry orders. This device permits a uniform predetermined quantity of french-fries to be filled. However, this device when operated, produces a lot of waste because of the segmented material falling outside the bag when the device is lifted from the bulk lot of french-fries or the multiple number of times the device has to be inserted and lifted to fill a predetermined amount of french-fries for a standard bag or carton.

On a larger scale, the devices described supra contemplated a holding device operable by one person to position a sack or bag for receiving particulate or granular matter which was gathered and loaded by a second person employing a shovel, scoop or similar implement. In some instances, these devices were provided with projecting handles to facilitate manual gripping. And, sometimes these devices were provided with retainer means for temporarily holding or suspending a bag or sack. The problems with these types of devices is the requirement of two persons and the number of individual parts needed to make the device thus having a high cost of manufacture and a constant attention to check for and repair any damage.

Another class of bag loading device was directed toward operation of a single person rather than two people normally required with the conventional system of filling sacks or bags. These devices took the approach of combining a bag holding device with a scoop or shovel which could be manipulated by one person to gather and direct particulate or granular matter into a bag or sack mounted on the aforementioned device. These devices commonly had a portion of the structure shaped like a scoop or shovel which could be manipulated to gather and retain a quantity of particulate or granular matter and transfer it to the sack or bag mounted on the opposite end to the scoop or shovel. Normally, handles were positioned at two or more locations on the device to facilitate its manipulation for the gathering and bagging functions. Examples of such devices can be found in U.S. Pat. Nos. 571,513; 791,472; 1,167,782 and 1,182,412. Although these devices eliminate the extra worker to hold the bag, the problem of maintenance and repair and the high cost of manufacturing per unit did not offset any advantage achieved from the utilization of these devices.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
| --- | --- | --- |
| 112,727 | March 14, 1871 | Lum |
| 791,472 | June 6, 1905 | Kaiser |
| 1,167,782 | January 11, 1916 | Richards |
| 1,182,412 | May 9, 1916 | Olesberg |
| 1,234,057 | July 17, 1917 | McIntyre |
| 3,255,570 | June 14, 1966 | Weimer |
| Des. 236,938 | September 30, 1975 | Bowen, Jr. |
| 4,175,603 | November 27, 1979 | Iaboni et al. |
| 4,470,627 | September 11, 1984 | Carroll et al. |
| 4,832,292 | May 23, 1989 | Beckham |
| Des. 304,872 | November 28, 1989 | Jebb |
| Des. 308,270 | May 29, 1990 | Sarabia |
| Des. 309,966 | August 14, 1990 | Bishop |
| Des. 314,270 | January 29, 1991 | Bryant |
| 5,065,965 | November 19, 1991 | Aulabaugh |
| 5,107,666 | April 28, 1992 | Rahtican |
| 5,137,316 | August 11, 1992 | Foos |
| 5,183,339 | February 2, 1993 | Williams |
| 5,205,107 | April 27, 1993 | Herink |
| Des. 345,642 | March 29, 1994 | Tucker, et al. |
| 5,395,147 | March 7, 1995 | Brown, et al. |
| Des. 376,237 | December 3, 1996 | Hayes, Sr., et al. |
| 5,593,117 | January 14, 1997 | Alexander, III |
| 5,655,739 | August 12, 1997 | Teh-Wah Goo |
| Des. 387,514 | December 9, 1997 | Savicki |
| Des. 389,971 | January 27, 1998 | Zickenberg |

SUMMARY OF THE INVENTION

The present invention incorporates a carrier convertible to a material handler for filling bags from a bulk lot of material. The front end of this unit is a scoop for gathering fluent, particulate, granular or loose material. The scoop is enclosed on its top by a hood that prevents spill out of any material when the present invention is raised into an upright position. The scoop tapers in longitudinal section into a flue. This tapering permits multiple units to nest into one another for storage purposes. The bottom side of the convertible carrier that leads to the scoop is flat for a distance prior to tapering into the flue in order to allow the scoop to act as a flat bottom shovel to shovel material against the ground, floor or flat surface or to have material swept into it like a dust pan. The flue ends at an opening and the opening is sized so that an industry-specific standard bag fits over the opening. The length of the flue is dimensioned so that, upon the bag being placed over the flue, a hand can grasp both the unit and bag easily. When grasped, the bag is tightened and secured to the device by the grasping hand. Other bags of different sizes can be accommodated by either gathering any slack with the gripping hand or making different size units. Above the hood are a pair of stanchions that have a handle traversing the pair. This handle allows for two-handed operation for heavy material, such as wet sand. The unit is sized such that the amount of material gathered from a single "scoop" would fill the bag to the appropriate level for the bag's particular purpose. Also, provided is a plug that when place in the flue inhibits material from passing through that flue. When the plug is placed adjacent the hood, a projection stores the plug out of the way during the bagging process and does not interfere with the flue opening.

The present invention also incorporates a process for using the unit of the present invention. The first step is to load a bag onto the unit and grip the bag and unit together as one. The next step is to scoop material into the unit. Then, the unit is lifted upright. Finally, the grasp on the bag is released and a new bag is loaded to repeat the process.

OBJECTS OF THE INVENTION

It is an object of the present invention to provide a single person system for filling containers with fluent material that would have required two people.

It is a further object of the present invention to provide a system for filling containers that saves time, money and manpower.

It is a further object of the present invention to provide a system that increases yield of fluent material entering into a container when filling the container.

It is a further object of the present invention to provide a system to mitigate back and hand trauma from filling containers.

It is a further object of the present invention to provide a system that is easy to use.

It is a further object of the present invention to provide a device that is durable.

It is a further object of the present invention to provide a device that stores easily.

It is a further object of the present invention to provide a device with a strap and a removable cap to permit the carrying of objects to a work site.

Viewed from a first vantage point, it is an object of the present invention to provide a convertible carrier comprising, in combination: a scoop converging to a chute; and a damper that regulates material in said chute.

Viewed from a second vantage point, it is an object of the present invention to provide a method of filling at least one container with fluent material comprising the steps of: loading a container onto a chute; scooping the fluent material with a scoop diverging from the chute; and lifting the scoop by a handle attached thereto in order to pass the fluent material from the scoop, through the chute and into the container.

These and other objects will be made manifest when considering the following detailed specification when taken in conjunction with the appended drawing figures.

DESCRIPTION OF PREFERRED EMBODIMENTS

Considering the drawings, wherein like reference numerals denote like parts throughout the various drawing figures, reference numeral 10 is directed to the convertible carrier according to the present invention.

In its essence, the carrier 10 has a large inlet 70 and a smaller outlet 80. The outlet 80 can receive a bag 40 to act as a bag filler. Outlet 80 can be closed using a plug 8 to act as an open topped vessel. Strap 30 and elastic cable 34 facilitates use.

Figure 6:
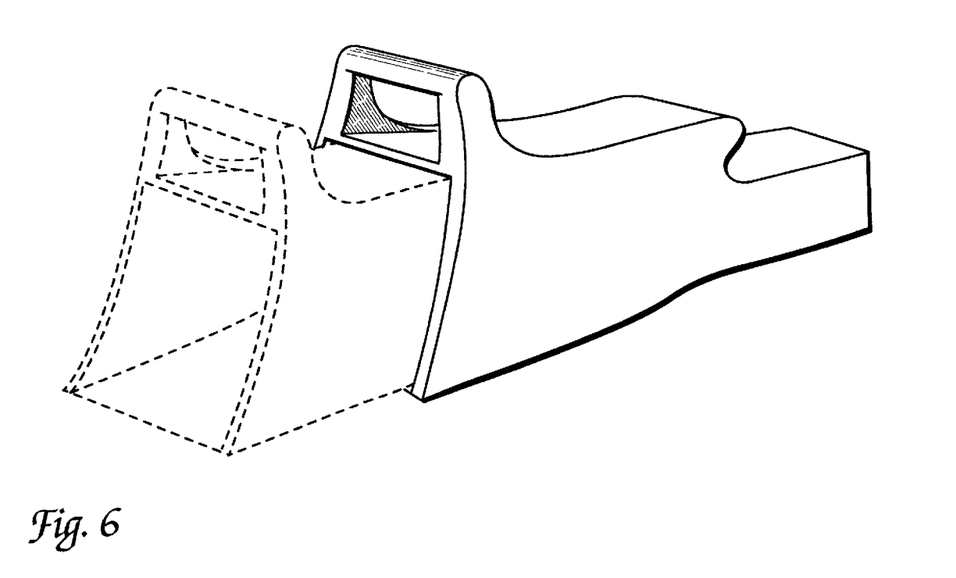
FIG. 6 is a view showing multiple devices in a stacked position.
Figure 7:
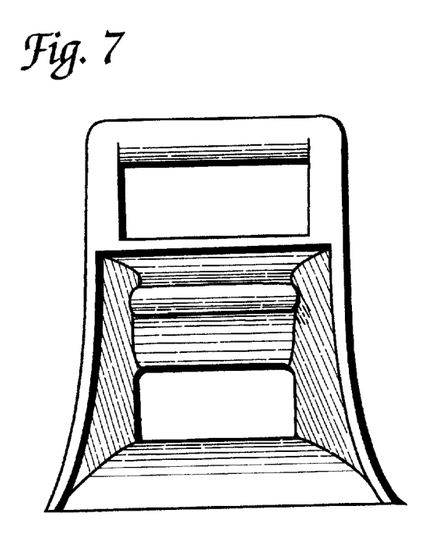
FIG. 7 is a front view without the straps for clarity.
Figure 8:
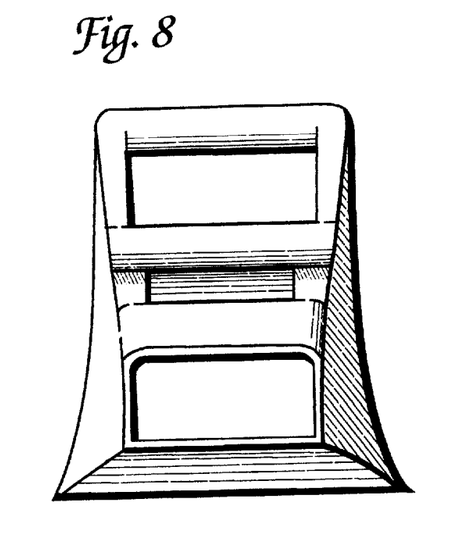
FIG. 8 is a rear view without the straps for clarity.
Figure 9:
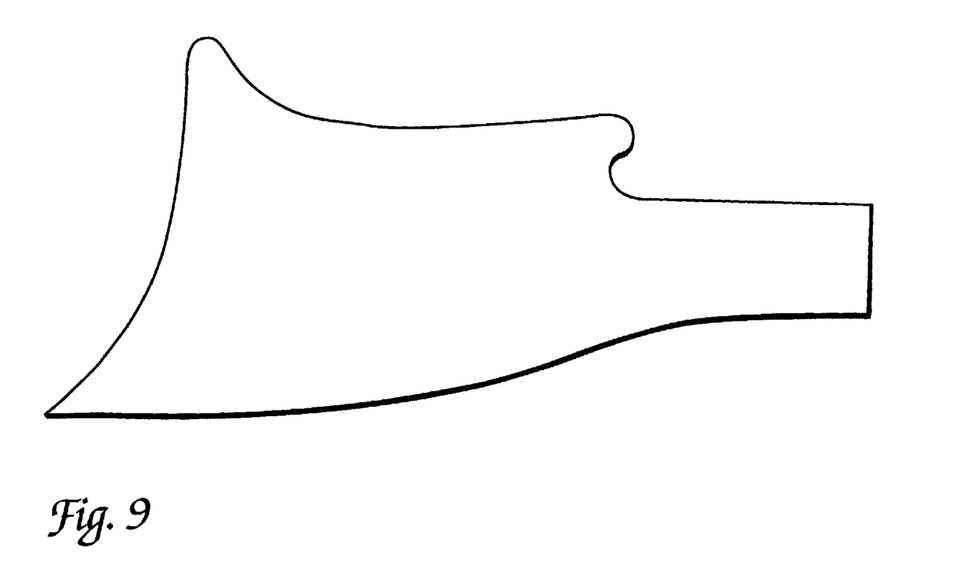
FIG. 9 is a side view without the straps for clarity.
Figure 10:
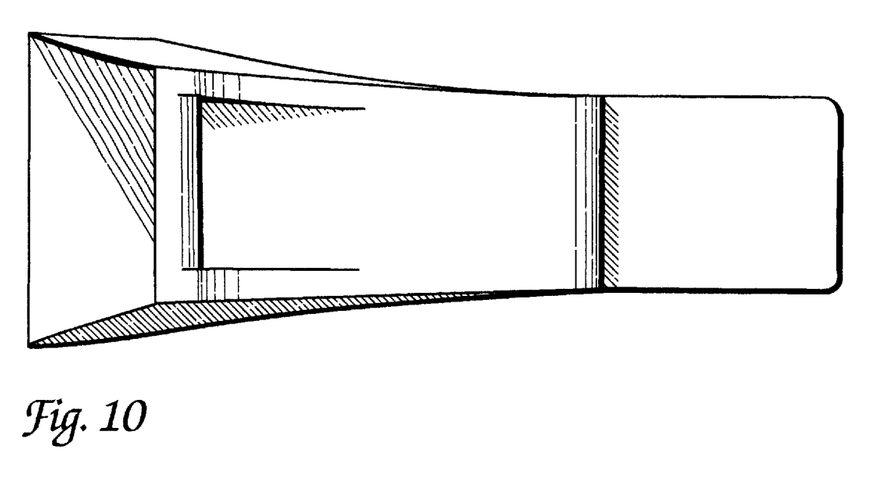
FIG. 10 is a top view without the straps for clarity.
Figure 11:
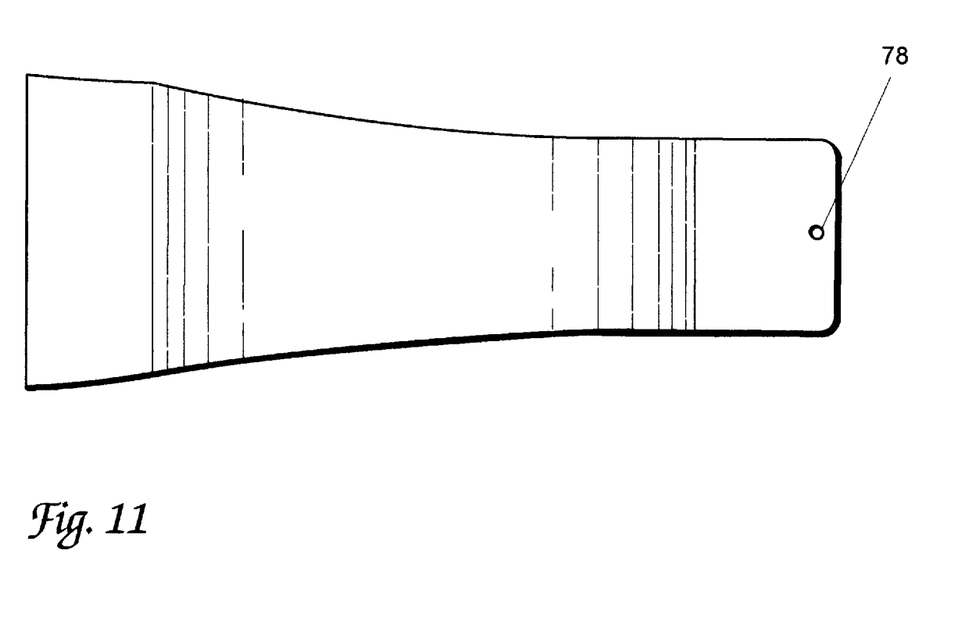
FIG. 11 is a bottom view without the straps for clarity.

As seen in the figures, the convertible carrier 10 preferably is formed as a conduit converging from its inlet 70 to its outlet 80 with interior side walls that are smooth to reduce friction in order for material to slide without sticking to the interior sides. The convertible carrier 10 is preferably made from recyclable linear low density polyethylene (LLDPE) by a roto-molded technology for resilience, uniform thickness, light weight, and one-piece strength. Also, the shape of the convertible carrier 10 permits self-stacking (FIG. 6) thus yielding minimal floor or wall space for off-season storage. FIG. 11 shows a hole H located on a bottom scoop side wall 2 adjacent outlet 80 to allow hanging on a wall.

Fluent material enters the convertible carrier 10 via inlet through scoop 2. Through a scooping motion (FIG. 4 arrow A) and then a raising up (arrow B) of the scoop 2, the fluent material 50 passes into a flue portion 6. Then the fluent material 50 is dispensed into a container 40 configured as a bag, see FIG. 4.

The scoop 2 defines one bottom side wall of a four walled construct which includes parallel side walls 5 and a hood 4 which serves as a platform for facilitating the single person operation for filling containers 40 and for the carry feature of the convertible carrier 10. The scoop 2 has a tapered "chisel" leading edge 2a which slopes from its inner surface to the outer surface. Each side wall 5 has a leading edge 5a which curves upwardly and rearwardly away from the chisel edge and towards the hood 4. Flue 6 includes a wall 7 which leads from switch back 12b. The cross-sectional area of the carrier's interior decreases from the inlet 70 to the outlet 80. Rising above hood 4 and integral with side walls 5 are two stanchions 22, that terminate at a predetermined length in order to provide a balanced ergonomic design. A handle 20 extends between the stanchions 22. The hood 4 melds into a projection 12 while the scoop 2 and side walls 5 converge into the flue 6. The projection 12 provides two salient features. The first feature utilizes the exterior portion of the projection 12 as a grip for a hand to grasp when the convertible carrier 10 is being used to fill containers 40 with the fluent material 50. See FIG. 5. In cooperation with the handle 20, the projection 12 provides a balanced ergonomic design that enables a user of the convertible carrier 10 to use good body mechanics (e.g., lower body leverage) when utilizing the convertible carrier 10 to fill containers 40. The second feature is the interior of projection 12 being a cavity 14 sized to accommodate a plug 8. See FIG. 1.

Figure 1:
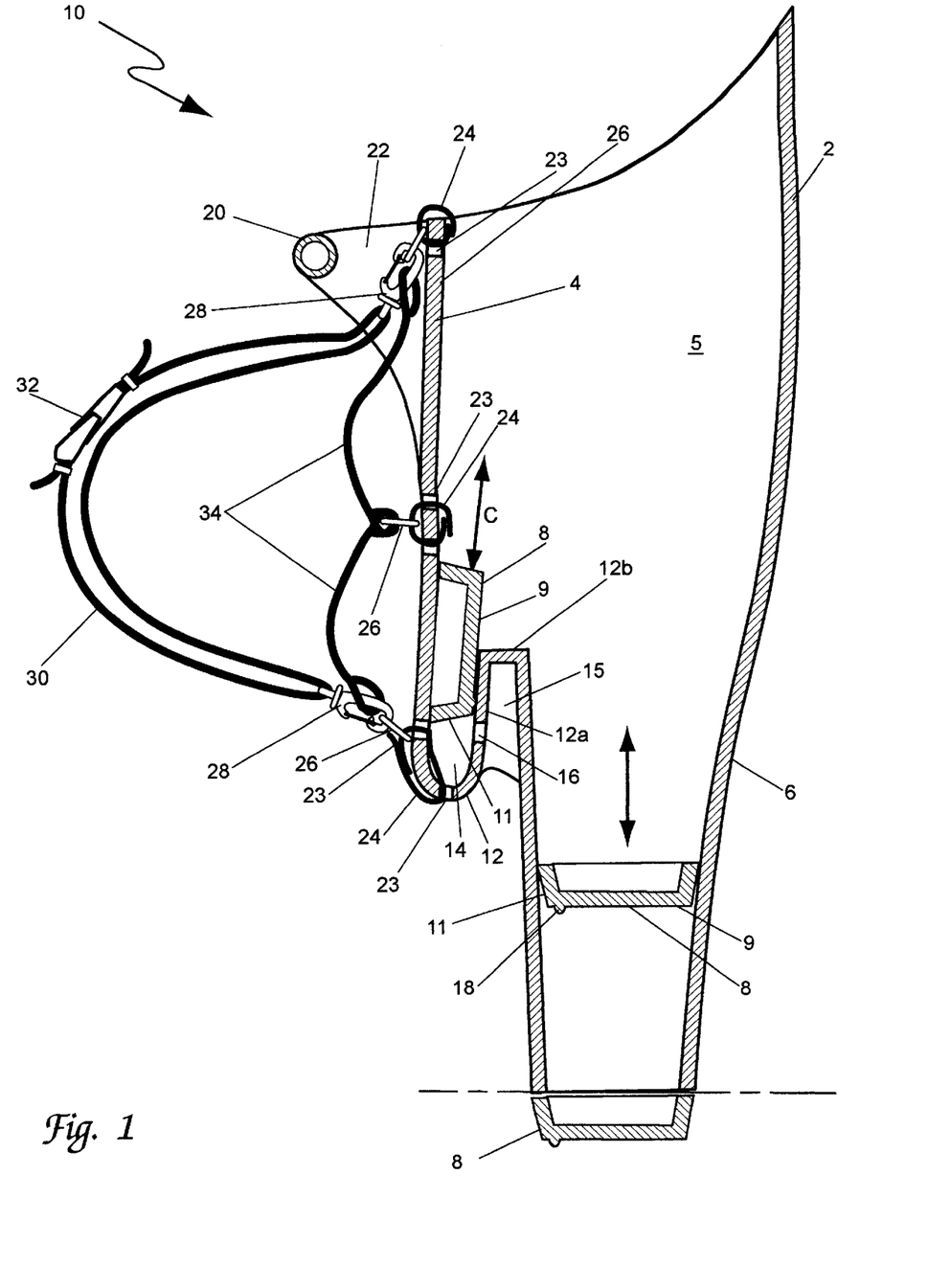
FIG. 1 is a side cut away view showing the two positions the cap can be placed when the device is in different modes of operation.

Plug 8 facilitates the conversion of the convertible carrier 10 between a vessel and a bag filler. Plug 8 is formed from the parting of the solid end of the convertible carrier 10 during the roto-mold process for manufacturing the convertible carrier 10 as shown in FIG. 1. As a result, plug 8 is able to be inserted into the flue 6 to inhibit materials from passing through the flue 6. This permits the convertible carrier 10 to be used as a carrier vessel for materials, such as tools, pliable bags, or sacks, that will become the containers 40 to be filled when the convertible carrier 10 is in use. When the convertible carrier 10 is being used as a means to fill containers 40 the plug 8 is placed within cavity 14 so that it is out of the way yet readily ascertainable in location and available in order to avoid loss of the plug 8. Moreover, with the plug 8 inserted into the flue 6, the convertible carrier 10 could be used to "bail out" fluid materials, such as water, or it could be used to move material from one lot to another lot.

The projection 12 has a finger hole 16 (or holes or an oval for several fingers) passing therethrough. Notice a tab 18 on plug 8. The tab 18 frictionally secures the plug 8 into the cavity 14 without having an entire bottom wall 9 of the plug 8 frictionally engage surface 12a. The plug 8 can be released from the cavity 14 by a user's finger(s) applying pressure on plug side wall 11 thus displacing the plug along arrow C.

Figure 4:
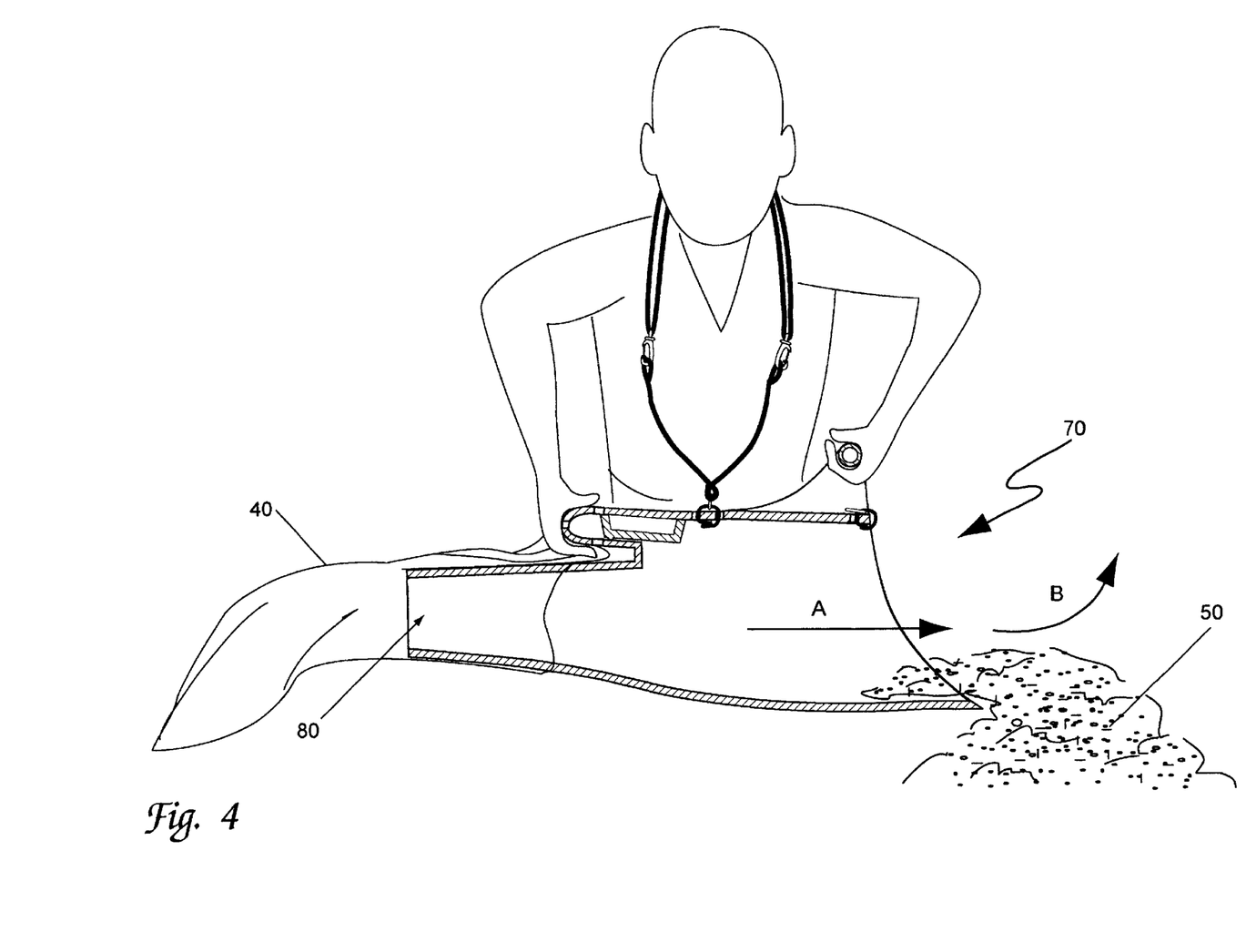
FIG. 4 is a side section view of the device in its operation mode.

The projection 12 and flue 6 meet at a switch back. Depression 15 of the switch back is defined by end wall 12b, adjacent surface 12 a and flue wall 7. The depression 15 is sized to accommodate a user's fingers in order to provide a firm grasp of the projection 12. The depression 15 also permits the user's fingers to anchor any container bag 40 to the flue 6 as shown in FIG. 4. In other words, a container bag 40 is mounted so that the bag mouth is over the flue 6 and a user's fingers would then grasp and if needed gather excess material of the container's 40 open end and wedge the container's 40 surplus material into the depression 15 in order to secure the container over the outlet 80 of convertible carrier 10.

Along the hood 4 and projection 12 are a plurality of guide holes for running three loops of material 24 therethrough. The guide holes define slots preferably 2"x¼" to accommodate the strapping. Clearly dimensions may vary Attached to each loop of material 24 is a metal or plastic ring 26 that are used as points of attachment. Two "C" clasps 28 releasably secure strapping 30 onto the hood 4 and projection 12 at distal extremities.

Figure 2:
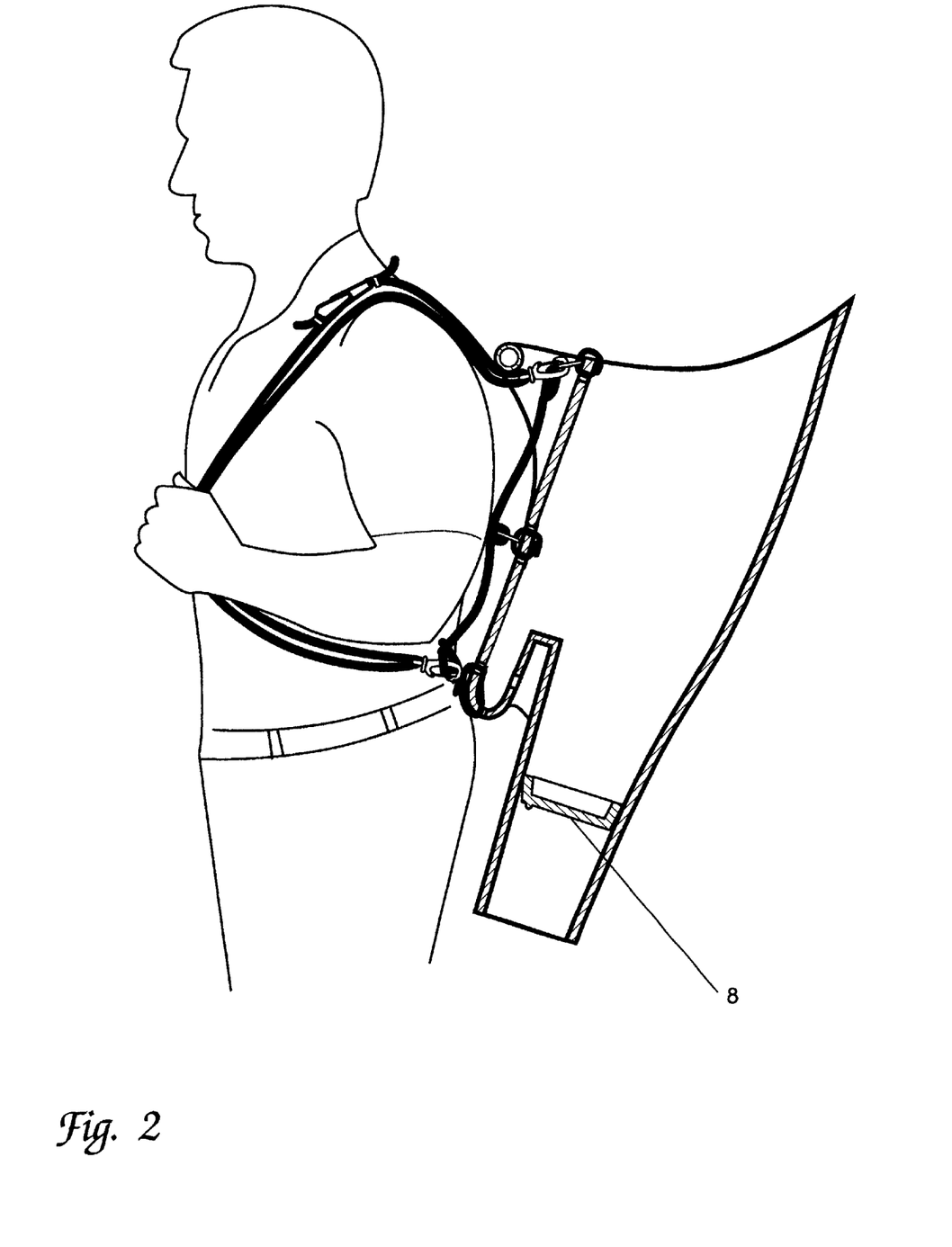
FIG. 2 is a section view showing utilization of the strap to carry the device.
Figure 3:
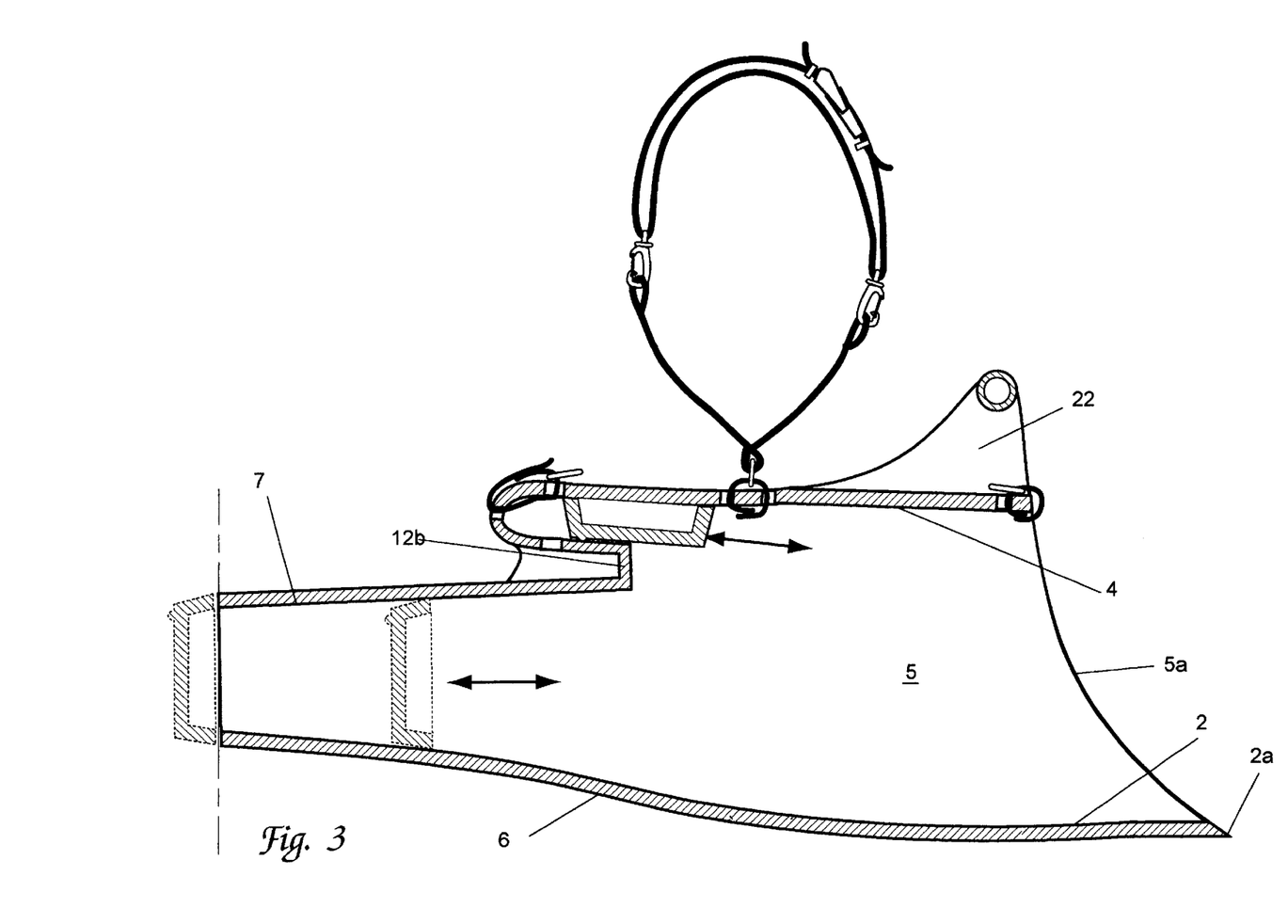
FIG. 3 is a side cut away view showing the device ready for operation.

Strapping 30 is adjustable in length via its strap adjuster 32. The strapping 30 is preferably wide and padded. Also as part of the strapping 30 there is elastic cabling 34. The cabling 34 and the strapping 30 allow two positions. The first position is as a hands-free, over the shoulder carrying pack. Here, the convertible carrier's 10 shape fits comfortably against the body, see FIG. 2. The second position is the "bagging" position, see FIG. 4. The strapping 30 is preferably wide and padded. Thus, in the scoop and filling container (bagging) position, the wide padded shoulder strap allows two hands to grasp the container 40 (bag) and provides relief from fatigue by supporting the unit, and encourages use of the legs. The unique elastic recoil action from the elastic cable 34 "energizes" the bagging motion. The strap 30 rests over the neck of the user and terminates in the resilient cabling 34 which has free ends attached to the strap ends and a medial portion connected to the hood 4 intermediate the distal connecting extremities. Thus, central location provides good balance and pivoting use whether one is left or right handed. When squatting and filling this scoop (arrow A, FIG. 4), then standing and rotating the device (arrow B, FIG. 4) the elastic cable helps lift the device higher when the elastic contracts. The device also benefits from hole 78 (FIG. 11) to allow storage thereat.

Figure 5:
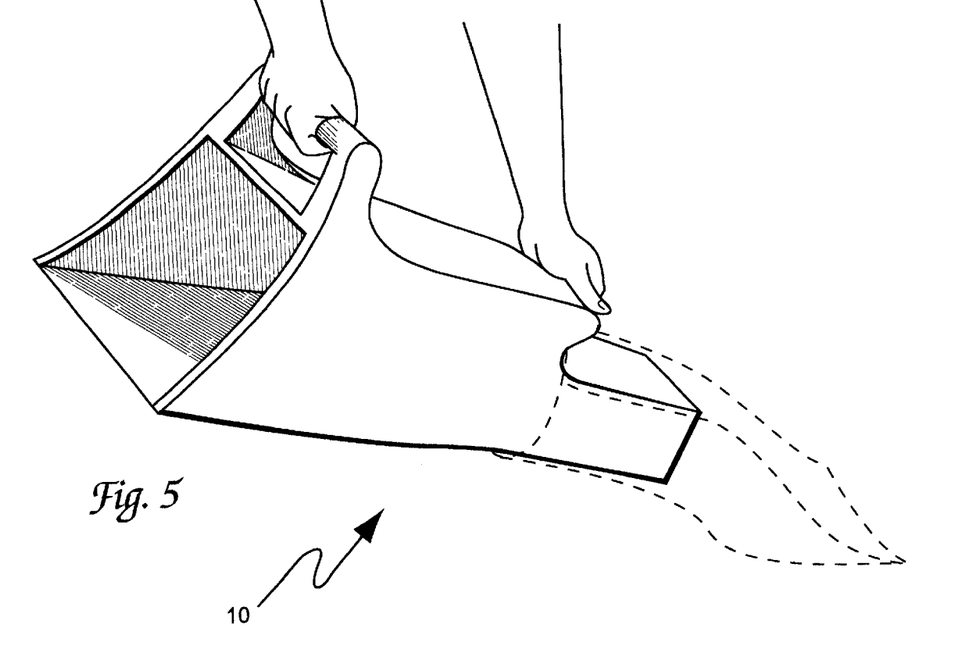
FIG. 5 is a perspective view of the device and bag.

FIG. 5 shows multiple devices 10 in a "stacked" configuration. In essence the inlet 80 is inserted into the outlet 70, which provides for easy stacking and transporting of multiple devices.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A convertible carrier, comprising, in combination:

a scoop converging to a chute said scoop having strapping means thereon to assist in support of said carrier; and a removable damper that regulates material in said chute, whereby said strapping means allows said carrier to be worn by a user during transport and also assist in lifting said carrier when material is being introduced to said carrier.

2. The convertible carrier of claim 1 wherein said chute is a flue.

3. The convertible carrier of claim 2 further comprising:

a hood covering a portion of said scoop.

4. The convertible carrier of claim 3 wherein said damper is embodied as a plug sized to inhibit material passing through said flue.

5. A convertible carrier, comprising, in combination:

a scoop converging to a chute;

a damper that regulates material in said chute;

wherein said chute is a flue;

further comprising a hood covering a portion of said scoop;

wherein said damper is a plug sized to inhibit material passing through said flue; and a projection extending from said hood and having a cavity therein sized for said plug.

6. The convertible carrier of claim 5 further comprising:

a finger hole through said projection for accessing and manipulating said plug.

7. The convertible carrier of claim 6 further comprising:

a stanchion extending from said hood and terminating at a handle.

8. The convertible carrier of claim 7 further comprising:

strapping attached to said carrier.

9. The convertible carrier of claim 8 further comprising:

a depression formed by the union of said projection and said flue; and wherein said depression is sized to accommodate a plurality of fingers.

10. A convertible carrier, comprising, in combination:

a scoop converging to a chute; and a damper that regulates material in said chute a hood covering a portion of said scoop;

wherein said damper can--be a plug sized to inhibit material passing through a flue; and a projection extending from said hood and having a cavity therein sized for said plug.

11. A convertible carrier, comprising, in combination:

a scoop leading to a chute and strapping means attached to said carrier to allow deployment of said carrier as an over the shoulder carrying pack as well as an over the neck filling container while still attached to said carrier.

12. The carrier of claim 11 wherein a portion of said strapping includes elastic cabling whereupon said elastic cabling helps lift said container.

13. The carrier of claim 11 wherein said strapping is connected to a hood portion of said scoop, opposite a bottom wall, said bottom wall and hood separated by and supported by walls.

14. The carrier of claim 12 wherein said elastic cabling is connected to a hood portion of said scoop at a medial portion thereof and a remainder of said strapping connects to free ends of said elastic cabling.

15. The carrier of claim 6 wherein said plug includes a tab to secure said plug against said projection.

16. A combined bag filler and article carrier, comprising, in combination:

a conduit having an inlet and an outlet, said conduit having a bag grasping projection integrally formed into said conduit to both gather bag material and serve as a grasping area adjacent said outlet for a one hand and a handle adjacent said inlet for another hand, a handle adjacent said inlet, and strap means for supporting said conduit.

17. The filler and carrier of claim 16 including a removable plug for said outlet and said projection includes means to carry said plug when not obstructing said outlet.

18. The filler and carrier of claim 16 wherein said inlet is larger than said outlet, to allow nesting of plural filler carriers within said outlet of one filler carrier nested within an inlet of another said filler carrier.

19. The filler and carrier of claim 17 wherein said projection includes an access hole to receive said plug.

20. The filler and carrier of claim 16 wherein said strap means includes an adjustable strap carried on a hood side of said carrier opposite a scoop side.

21. The filler and carrier of claim 16 wherein said strap means includes elastic cabling carried on a hood side of said carrier opposite a scoop side.

* * * * *